Dec. 4, 1956     I. R. VERSOY ET AL     2,772,686
VALVE MECHANISM
Filed Nov. 28, 1952
Fig.1.
Fig.2.
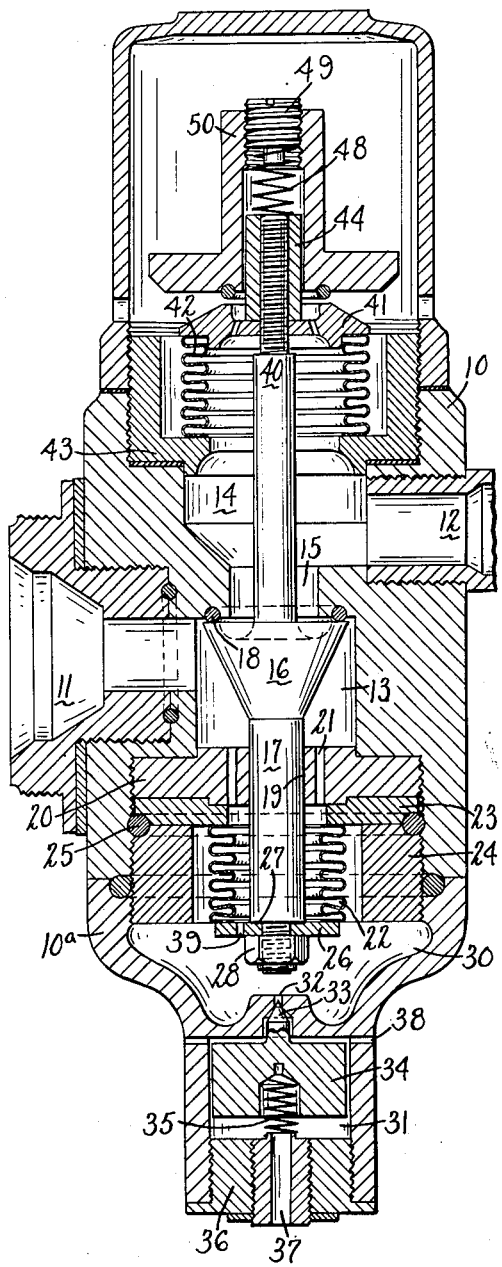
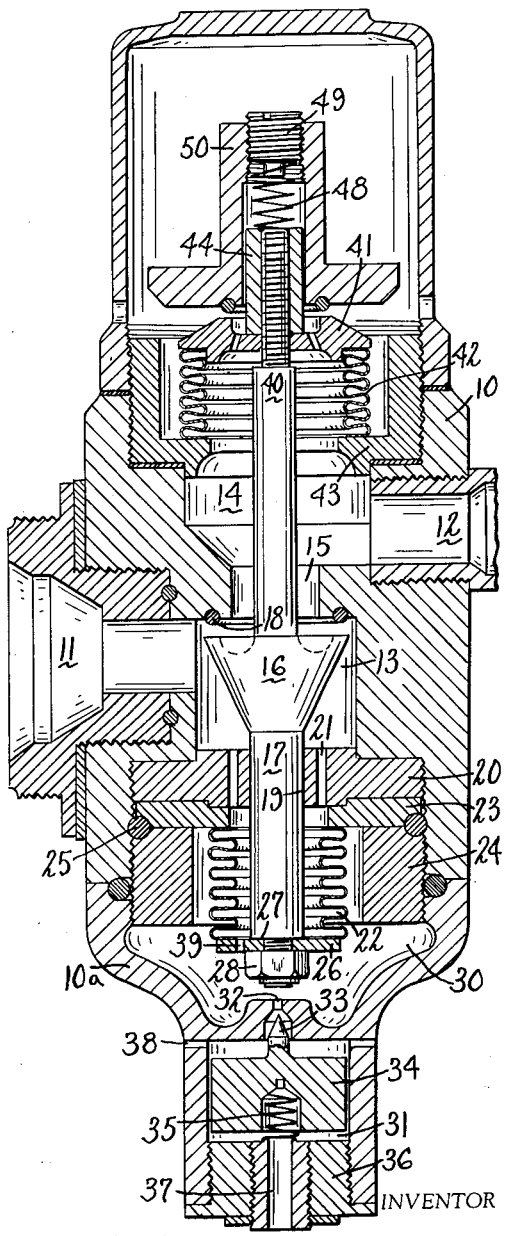
INVENTOR
Irving B. Versoy
and Frederic D. Holler
BY Rockwell & Bartholow.
ATTORNEYS United States Patent Office 2,772,686
Patented Dec. 4, 1956

2,772,686

VALVE MECHANISM

Irving R. Versoy, New Haven, and Frederic D. Moller, Orange, Conn., assignors to The Berger Brothers Company, New Haven, Conn., a corporation of Connecticut Application November 28, 1952, Serial No. 322,864

2 Claims. (Cl. 137—39)

This invention relates to a fluid pressure control apparatus, and more particularly to a valve mechanism designed to control the admission or passage, of fluid under pressure, usually air, for example, to a receptacle. Moreover, the device is adapted to control the admission of pressure fluid to a receptacle under the control of a force of acceleration or centrifugal force, and thus is admirably adapted for use in connection with airplanes.

When an airplane makes a change in its direction of speed the parts thereof as well as the pilot are subject to forces of acceleration or centrifugal force, and it is desirable to provide mechanism for introducing pressure into a receptacle within the plane, which mechanism will be so actuated or controlled that fluid pressure will be introduced into the receptacle under the control of centrifugal force. In other words, communication between a source of pressure fluid and the receptacle will be opened or closed according to whether or not the valve mechanism is subjected to a force of acceleration or of centrifugal force.

In the present instance this is accomplished pneumatically in that a valve is provided which controls the communication between the pressure source and the receptacle, which valve is normally held closed, at least in part, by air or fluid pressure. However, this air or fluid pressure is released or relieved when the mechanism is subjected to a force of acceleration so that the valve will open and admit pressure fluid to the receptacle. As a result of the employment of pneumatic means to control the opening and closing of the valve, the mechanism comprises relatively few parts and is more efficient in operation than if mechanical means were employed for this purpose.

In addition it may also be desirable to limit the degree of pressure in the receptacle so that not only the admission of air or fluid under pressure to the receptacle is controlled, but also the degree of pressure obtaining in the receptacle is regulated in order that the latter be neither higher nor lower than that desired even though the pressure at the source of fluid pressure is maintained at a constant figure.

One object of the invention is to provide a new and improved fluid pressure control mechanism.

Still another object of the invention is to provide a new and improved fluid pressure control apparatus comprising a valve mechanism for controlling the passage of fluid pressure to a receptacle and pneumatic means for controlling the opening and closing of the valve.

Still another object of the invention is to provide a fluid control apparatus consisting of a casing having a valve controlled port therein to control the passage of fluid pressure to a receptacle and pneumatic means for opening and closing said valve to permit communication between a source of pressure and the receptacle, said pneumatic means being in turn controlled by a force of acceleration or centrifugal force.

More specifically the invention resides in a fluid-pressure-controlling apparatus which comprises a valve casing having inlet and outlet passages and a valved port for controlling communication between said passages, the position of said valve being determined by a pneumatic device comprising a collapsible bellows normally having equal pressure on both sides thereof, and means for venting the pressure upon one side of the bellows in order to permit pressure on the other side to move the valve, said last-named means being actuated by a force of acceleration to which the mechanism will be subjected.

To these and other ends the invention consists in the novel features and combinations of parts to be hereinafter described and claimed.

In the accompanying drawings:

Fig. 1 is a sectional view of a valve mechanism embodying our invention, the controlling valve being shown in closed position; and Fig. 2 is a sectional view similar to Fig. 1, the controlling valve being shown in open position.

To illustrate a preferred embodiment of our invention we have shown a valve mechanism comprising a casing 10 having an inlet passage 11 adapted to be connected to a source of fluid under pressure, air for example, and an outlet passage 12.

Within the casing is a chamber 13 in constant communication with the inlet passage 11 and a chamber 14 in constant communication with the outlet passage 12. These chambers communicate with each other through a port 15 designed to be controlled by a valve 16 carried by a valve stem 17.

As shown, the valve 16 is of conical shape and designed to contact with a packing ring 18 so as to effectively seal the port 15 when in the position shown in Fig. 1 and prevent the passage of fluid under pressure to the outlet chamber 14. The valve stem 17 is guided through an opening 19 provided in a gland 20 secured in the casing 10.

The gland 20 is provided with through openings 21 to permit passage of pressure fluid from the chamber 13 downwardly into the interior of a pneumatic device comprising a collapsible bellows 22. At its upper end this bellows is secured to and carried by a disk-like base member 23, this member being held in place by a gland member 24 threadedly secured in the casing and bearing against a packing ring 25 so as to make an airtight seal and prevent any pressure fluid escaping from the chamber 13 except that which passes into the collapsible bellows 22.

At its lower end the collapsible bellows is secured to a disk-like or washer-like member 26 held against a shoulder 27 on the valve stem 17 by a nut 28. As the upper end of the bellows is held stationary by the gland 24, it will be seen that any opening and collapsing of the bellows will tend to move the valve 16 as the base 26 of the bellows is secured to the valve stem 17.

The valve casing comprises a lower portion 10ª which provides a chamber 30 below the diaphragm and also a valve chamber 31 which communicates with the chamber 30 through a small port 32. This port is controlled by a valve 33 of conical shape, this valve being secured to or formed integrally with a weighted member 34 in the chamber 31.

A spring 35 is mounted below the weight 34 and urges this weight and the valve 33 to position to close the port 32, the spring resting upon a closure member 36 threaded into the lower end of the casing 10ª below the chamber 31. This closure member may be provided with a port 37 to permit the escape of air or other fluid under pressure from the chamber 31 and preferably this chamber is also provided with vent ports 38 above the weight 34 to permit the escape of air under pressure when the valve 32 is opened.

A vent port 39 is provided in the washer 26 so as to permit restricted communication between the interior of the collapsible bellows 22 and the pressure chamber 30. It may here be noted that while the port or vent opening 39 is a restricted opening, it nevertheless affords constant communication between the chamber 30 and the interior of the bellows so that normally (that is when the valve 33 is closed) equal pressures will exist within and without the bellows 22. Also it will be understood that normally the mechanism is so arranged that with equal pressure on the outside and inside of the bellows the valve 16 will be closed. The set of the bellows itself may be sufficient to compensate for the weight of the valve.

It will also be understood that the spring 35 is sufficiently strong to normally overcome the pull of gravity on the weight 34 so that the valve 33 will ordinarily be held in closed position, closing the port 32 and preventing the escape of pressure from the chamber 30. Thus normally the valve stands in the position shown in Fig. 1 so that while fluid under pressure will enter the chamber 13 through the port 11 the valve 16 will be held closed by the pressure below this valve and below the bellows 22 so that no pressure will be delivered to a receptacle or other place of delivery through the outlet passage 12.

However the mechanism is designed, under control of acceleration or centrifugal force, to deliver fluid pressure through the passage 12 to a receptacle to which this passage is designed to be connected. It will be remembered that the spring 35 is designed to overcome the ordinary pull of gravity on the weight 34. However, when the mechanism is mounted in an airplane and the change of direction or speed of the airplane is such as to effect an additional pull upon the weight 34 due to forces of acceleration or centrifugal force, the weight 34 together with the valve 33 which it carries will be moved downwardly against the tension of spring 35 and thus permit the venting of fluid pressure from the chamber 30 through the valved port 22 and the vent ports 38. Pressure in the chamber 30 will thereupon be immediately reduced and pressure inside the bellows 22 will expand the latter and move the valve 16 downwardly to open position thus permitting fluid pressure to pass into the chamber 14 and out of the passage 12 to the receptacle. This position of the parts is shown in Fig. 2. It will be understood that the restricted vent passage 39 is not sufficiently large to maintain equal air pressure on both sides of the bellows 22 when the port 32 is open.

The valve 16 will remain open so long as the valve 33 remains open or so long as the action of acceleration or centrifugal force on the weight 34 is sufficient to overcome the force of the spring 35. So soon, however, as the forces of acceleration are non-existent or are too feeble to overcome the strength of the spring, the weight 34 will be moved upwardly by the spring, the valve 33 closed, and the bellows will return the valve 16 to closed position.

It may also be desirable in some instances not only to control the admission of pressure fluid to the receptacle as has been above described, but also to regulate the degree of pressure which exists in the receptacle, that is, to maintain the pressure of the fluid delivered through the passage 12 at a certain figure even though the pressure at the source or that entering through the inlet passage 11 may be at a higher figure.

For this purpose the valve may be provided with an upwardly extending stem 40 to which is threadedly secured the upper base 41 of a pneumatic mechanism comprising a collapsible bellows 42, the lower end of this bellows being secured to a gland nut 43 threaded into the upper end of the casing 10. A collar or sleeve 44 is threaded upon the upper end of the valve stem 40 and a compression spring 48 acts between the upper end of this sleeve and a screw 49 threaded into a weight member 50.

Thus the weight member 50 is supported on the valve stem by means of the spring 48 and this weight acts (as illustrated) in a downward direction or in opposition to an opening movement of the bellows 42. Thus when the valve 16 is opened and air pressure passes into the chamber 14, it will also pass into the interior of the bellows 42 which opens into the chamber 14. This will tend to expand the bellows and thus tend to move the valve 16 to closed position. This movement, however, will be opposed by the weight 50, which weight will, of course, also be subject to the same forces of acceleration and centrifugal force as is the weight 34. As a result a balance will occur between the forces tending to open the valve and the action of acceleration on the weight 50 tending to close the valve so that it will regulate the degree of pressure obtaining in the air or fluid passing into the receptacle.

In other words when the pressure in the chamber 14 exceeds a certain figure, the collapsible bellows will be expanded and will close the valve 16. When, however, the pressure in the chamber 14 drops below a pre-determined figure the weight 50 under the forces of acceleration will open the valve and maintain pressure in the receptacle through the outlet passage 12. The weight 50 may be regulated so as to maintain any pressure desired in the receptacle. Likewise the weight 34 and spring 35 may be so proportioned as to effect the "cut in" of the mechanism at any particular degree of acceleration to which the weight 34 is subjected. That is, the parts can be so adjusted that pressure fluid will be delivered through the passage 12 at any time the forces of acceleration reach a pre-determined amount and also so adjusted that any desired degree of pressure may be delivered to the receptacle according to the degree of centrifugal force when the latter is at or above the pre-determined amount referred to.

While we have shown and described a preferred embodiment of our invention, it will be understood that it is not to be limited to all of the details shown, but is capable of modification and variation within the spirit of the invention and within the scope of the claims.

What we claim is:

1. In a fluid-pressure control apparatus, a casing having positive pressure inlet and outlet means, a port affording communication between said means, a valve controlling said port, a flexible pneumatic member connected to said valve and biased to urge the valve to closed position, means normally subjecting both sides of said member to the fluid pressure in said inlet means to hold the valve in closed position, means controlled by the action of centrifugal force to vent to the atmosphere the fluid pressure on one side of said member and effect the opening of the valve, said last-named means comprising a vent port leading from said one side of said member, a weighted valve member moved by centrifugal force to control said port, and a spring acting against the weight of said weighted valve member to bias the valve member toward closed position, a second flexible member, exposed on one side thereof, to the pressure in said outlet means and on the other side to atmospheric pressure, said second flexible member being connected to said first valve to urge it toward closed position when subjected to the pressure in said outlet means after said first valve is opened under the influence of said first flexible member.

2. In a fluid-pressure control apparatus, a casing having positive pressure inlet and outlet means, a port affording communication between said means, a valve controlling said port, a flexible pneumatic member connected to said valve and biased to urge the valve to closed position, means normally subjecting both sides of said member to the fluid pressure in said inlet means to hold the valve in closed position, means controlled by the action of centrifugal force to vent to the atmosphere the fluid pressure on one side of said member and effect the opening of the valve, said last-named means comprising a vent port leading from said one side of said member, a weighted valve member moved by centrifugal force to control said port, and a spring acting against the weight of said weighted valve member to bias the valve member toward closed position, a second flexible member connected to said first valve to urge it toward closed position when subjected to the pressure in said outlet means after said first valve is opened under the influence of said first flexible member, said second flexible member being exposed on one side to pressure in said outlet means and on the other side to atmospheric pressure, and a weight supported on said second flexible member and responsive to centrifugal force to exert pressure thereon in opposition to pressure existing in said outlet means.

References Cited in the file of this patent

UNITED STATES PATENTS

| | | |
|---|---|---|
| 542,702 | Christensen | July 16, 1895 |
| 1,676,084 | Flagg | July 3, 1928 |
| 2,177,063 | Gottlieb | Oct. 24, 1939 |
| 2,291,101 | Papulski | July 28, 1942 |
| 2,355,881 | Mallory | Aug. 15, 1944 |
| 2,622,609 | Moller | Dec. 23, 1952 |
| 2,651,316 | Fageol | Sept. 8, 1953 |